Patented Oct. 19, 1937

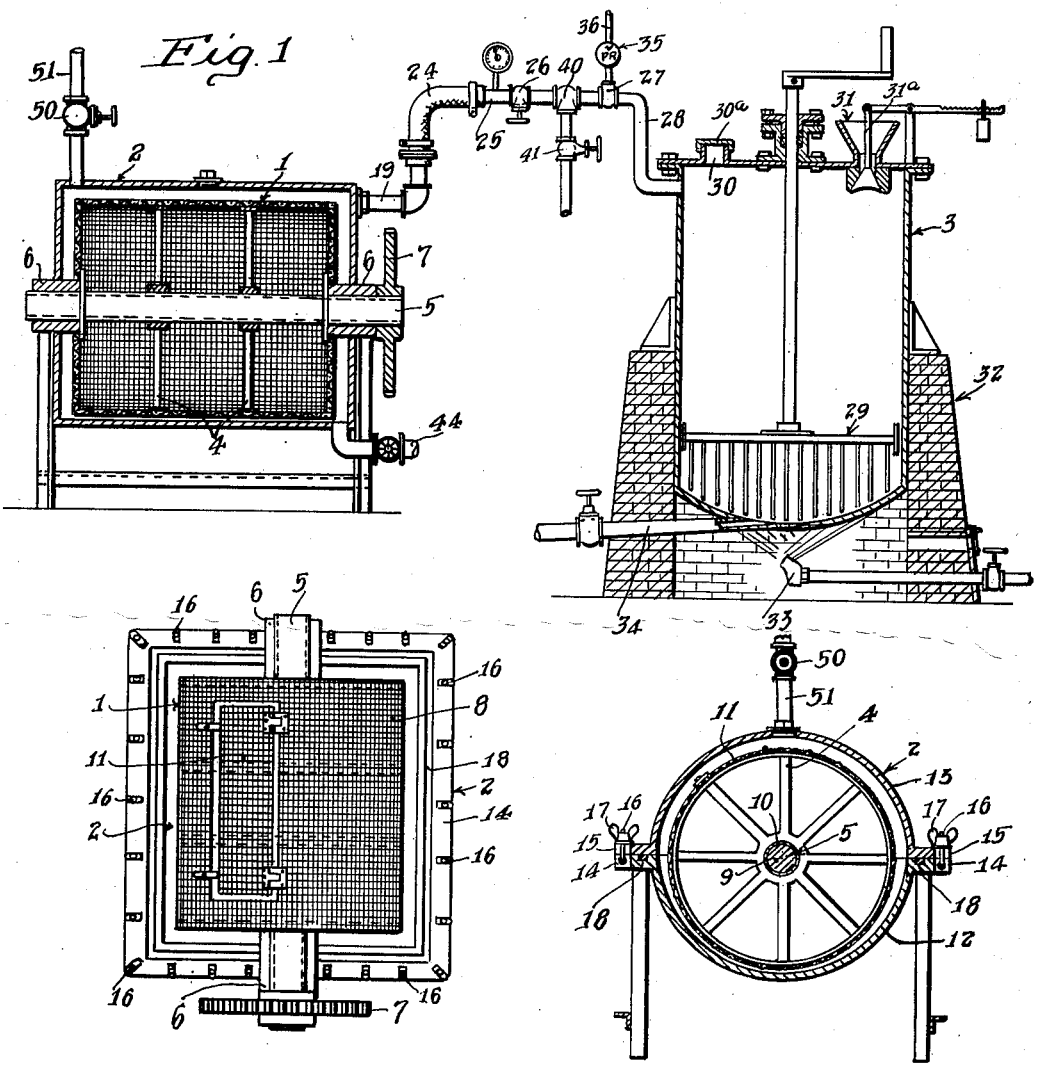

2,096,090

UNITED STATES PATENT OFFICE 2,096,090

PROCESS FOR RECOVERING TIN FROM TIN PLATE

David E. De Lape, Pasadena, Calif.

Application October 1, 1935, Serial No. 42,995

4 Claims. (Cl. 75—98)

This invention relates to the processing of tin and more particularly to the recovery of tin from tin plate, such as old tin cans and the like.

An object of the invention is to recover tin from tin plate at low cost.

Tin is relatively expensive as compared to most common metals, because of scarcity of new metal and because most of the metal used in industry is not recoverable after being once used. Thus a large portion of the total tin consumed is used to coat the thin sheet iron or steel employed in tin cans. These tin cans are used in steadily increasing quantities as containers for foodstuffs, automobile oils and many other substances but in the forms commonly employed they are capable of use only once. Thereafter they become scrap and their tin content is lost. Because of the high cost of tin, many attempts have been made to recover the metal from scrap tin plate and processes have been developed which are more or less successful on new clean tin plate, such as the scrap resulting from manufacturing operations. However, to the best of my knowledge, no commercially practicable method of recovering tin from old cans coated with dirt, oil, paint, laquer, etc. has heretofore been known.

I have discovered, in accordance with the present invention, that tin may be economically reclaimed from tin cans and the like, regardless of their age, previous use or condition, by treating them with hydrogen chloride gas at a low temperature in the presence of a limited amount of water, the latter being present in the form of a film on the scrap. By such treatment the tin is dissolved to form tin chloride whereas I have found that very little, if any, of the underlying iron is dissolved. The tin chloride may then be washed off the iron residue and either refined and sold as the salt or converted into metallic tin by electrolysis. Large quantities of tin salts are used in industry and it is therefore usually advantageous to dispose of the tin chloride rather than to reconvert it into metallic tin.

The details of my process will now be explained with reference to the drawing, in which:

Fig. 1 is a diagram showing in vertical section a suitable apparatus for practicing my process;

Fig. 2 is a plan view of the treating receptacle shown on the left side in Fig. 1; and Fig. 3 is a cross section of the treating receptacle.

Referring to Fig. 1, the scrap tin plate to be treated is first moistened, as by playing a hose on it, and then shoveled into a rotatable cage 1 adapted to be positioned in a fluid tight treating chamber 2, into which hydrogen chloride gas is introduced from a generator 3.

The cage 1 is cylindrical in shape and may consist of a plurality of supporting spiders 4 mounted upon a shaft 5, which is adapted to be supported in bearings 6 in opposite end walls of the chamber 2. The shaft 5 has mounted thereon exterior of the chamber 2 a gear wheel 7 adapted to be rotated by any suitable source of power (not shown). Mounted upon the peripheries of the spider elements 4 is a cylindrical wall 8 of perforated metal resistent to hydrogen chloride, such as Monel metal. The ends of the cage 1 may also be formed of perforated disks of Monel metal secured to the outer spiders 4. The spiders 4 may be made of cast iron which is relatively resistent to corrosion by hydrogen chloride and the shaft 5 may be of double construction consisting of a central shaft 9 of steel surrounded by a snugly fitting sleeve 10 of Monel metal. The cylindrical wall 8 of the cage is provided with a door 11 for the insertion and removal of the scrap to be treated.

The treating chamber 2 is preferably made in two pieces. Thus as shown more clearly in Figs. 2 and 3, it comprises a lower portion 12 of approximately semi-cylindrical shape slightly larger than the cage 1 and a semi-cylindrical cover 13 adapted to fit on and seal with the lower portion 12. Thus each portion 12 and 13 is provided with outwardly extending flanges 14 and 15, respectively, adapted to be locked together by bolts 16 and wing nuts 17. The bolts 16 are hinged in slots provided therefor in the outer edge of the lower flange 14 and are adapted to enter cooperating slots in the cover flange 15. This arrangement permits rapid attachment and removal of the cover 13, which is important since the cover must be removed each time a new charge is introduced into the cage 1.

To insure a fluid tight seal between the flanges 14 and 15, the lower flange 14 is preferably provided with a groove 18 adapted to receive a gasket of resilient material, such as asbestos packing. The bearings 6 which support the shaft 5 are made in two halves, one half attached to the lower part 12 of the chamber and the upper half attached to the cover 13 so that when the cover 13 is removed the shaft bearings are also opened up at the same time to permit complete removal of the cage 1 from the chamber 2.

The cover 13 of the chamber 2 is provided with a gas inlet connection 19 at one end. The inlet connection 19 is adapted to be connected through a hose connection 24, a pipe 25, a control valve 26, a T connection 40 and a T connection 27 and an outlet pipe 28, to the hydrogen chloride generator 3. The latter consists of a vertically disposed cylindrical tank having an agitator 29 therein and having an opening 30 for the introduction of dry material and a valve 31 for the introduction of liquid. The tank is preferably mounted in a setting 32 and adapted to be heated by a burner 33. It may also be provided with a clean-out pipe 34.

Hydrogen chloride may be produced in the generator 3 by introducing sodium chloride (common salt) and sulfuric acid and heating the mixture. The sodium chloride is preferably introduced first through the opening 30 by removing the cap 30a therefrom. Thereafter the sulfuric acid is introduced through the opening 31 by first pouring the acid into the funnel shaped receptacle at the upper end of the opening and then deflecting the plunger 31a to permit the acid to flow into the tank. At first, if the sulfuric acid employed is strong, there will be an evolution of hydrogen chloride without the application of heat. However, in order to utilize fully the reagents, heat must be eventually applied to complete the reaction. The reaction is well known and may be represented by the formula

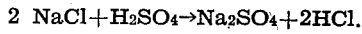
$$2\ NaCl + H_2SO_4 \rightarrow Na_2SO_4 + 2HCl.$$

To prevent excessive pressure being built up in the generator 3, connection is made from the T 27, through a safety valve 35 to a vent pipe 36. Ordinarily excess production of hydrogen chloride is prevented by careful gauging of the quantity of acid introduced and the heat applied to the generator 3.

The complete process is carried out as follows: Scrap tin plate, which has preferably been shredded or cut into relatively small pieces, is wet either by dumping it in a tank of water or by playing a hose on it, and then shoveled into the cage 1, the cage being positioned in place in the lower portion 12 of the treating chamber 2 but the cover 13 being removed. Thereafter the cover 13 is placed on top of the receptacle 12 and clamped in place. Then power is applied to slowly rotate the shaft 5 and cage 1, and hydrogen chloride gas is introduced into the chamber 2 by opening the valve 26 and introducing acid into or applying heat to the generator 3, whichever act is necessary to evolve hydrogen chloride.

At the start, the chamber 2 contains air at atmospheric pressure, and it is usually desirable to vent this air by opening a valve 50 in a vent pipe 51 mounted on the cover 13. Thereafter the valve 50 is closed to prevent escape of the hydrogen chloride, which displaced the air. The hydrogen chloride is rapidly absorbed by the water on the surfaces of the scrap, and at first the pressure drops. It is advantageous to maintain some pressure in the chamber 2, by regulating the operation of the generator 3 as it facilitates the entry of the hydrogen chloride into folds and wrinkles in the scrap plate being treated.

In some instances, as when a small generator is employed and there is considerable water in the chamber 2, it may be difficult to maintain a pressure above atmospheric in the chamber. Under these conditions, pressure may be built up by introducing into the chamber a quantity of another gas, such as air, through a valve 41 connected to the T connection 40. The gas is preferably substantially chemically inert with respect to the other materials present in the chamber 2. Air satisfies this requirement, and has the further advantage of being readily obtained. A gauge 42 indicates the pressure in the chamber 2. I have found it satisfactory to employ pressure of five pounds per square inch but greater pressure may be employed if the chamber is built to withstand it. However, it is preferable to avoid excess water and thereby avoid the necessity of introducing an inert gas in order to maintain a desired pressure.

After the moist tin plate has been exposed for a period of time to the hydrogen chloride, it acquires a coating of tin chloride as a result of the reaction between the hydrogen chloride and the tin of the tin plate. If the coating of tin is very thin, the treatment may be continued as described until practically all of the tin has been converted into tin chloride. Thereafter water, or a solution of hydrogen chloride and tin chloride derived from previous operations, is introduced into the lower part of the chamber 2 through a pipe 44, the level of the liquid being raised until all of the scrap in the rotating cage 1 is washed therein. This dislodges practically all of the tin chloride from the surface of the scrap. Thereafter if, as previously mentioned, the coating of tin on the scrap is very thin, the treated scrap is removed from the apparatus by taking off the cover 13, opening the door 11 of the cage and dumping out the treated scrap. Thereafter a new charge may be introduced and the process repeated.

However, if the coating of tin on the scrap being treated is relatively thick, it is sometimes advisable to first treat the scrap with the hydrogen chloride gas, as described, for about an hour, then introduce water or tin chloride solution through the pipe 44 to wash the scrap and rewet it, then withdraw the liquid and then expose the scrap to the hydrogen chloride gas for another period. In some instances it may be found desirable to repeat this process several times before the treated scrap is finally discharged.

It may be assumed when the process is first started that water is introduced into the chamber 2 to wash the scrap. This water absorbs some hydrogen chloride gas from the chamber and also dissolves the tin chloride from the surface of the tin scrap. The water is therefore converted into a dilute solution of hydrochloric acid and tin chloride. This solution may thereafter be withdrawn to a suitable storage tank and held there until the tin scrap in the cage 1 is again to be washed. The same solution that was previously employed may then be pumped into the chamber 2 again and again until the solution has reached a desired concentration of tin chloride and hydrochloric acid. The solution may then be removed from the system and treated to recover the tin therefrom.

Many methods of recovering tin from tin chloride solution or for refining the solution to produce relatively pure dry stannous chloride are known and do not constitute a part of the present invention. I have discovered, however, that the solution produced in the manner described makes an excellent tin plating bath for use in electrolytic plating of tin and may be economically used for this purpose.

I have found it desirable to introduce hydrogen chloride gas into the chamber 2 at a pressure of from 2 to 10 pounds per square inch in order to facilitate penetration of the gas into all folds or cups, recesses and crevices in the tin plate. It is desirable to turn the cage 1 very slowly to shake off the tin chloride or its solution as it is produced, together with foreign matter, and expose fresh surfaces to the action of the gas.

In some instances it may be found desirable to maintain the weak solution of stannous chloride in the lower part of the chamber 2 at all times and regulate the frequency of wetting of the scrap by rotating the cage 1 very slowly, the latter dipping into the liquid only an inch or two and having vanes extending longitudinally thereof to prevent the scrap from falling back into the liquid, after removal therefrom, until it has been raised nearly to the upper part of the chamber.

It is important that the temperature within the chamber 2 be kept quite low as this is necessary to prevent the hydrogen chloride from dissolving the iron of the scrap as well as the tin. I prefer to maintain the temperature below 30° C., particularly during the later stages of the process when much of the tin has been removed, thereby exposing large areas of iron surface to the action of the hydrogen chloride. I have found that at temperatures above 50° C. considerable iron is dissolved.

When the tin is recovered from the tin solution obtained from chamber 2 by electrolysis, the resultant solution may be advantageously used again to wash more scrap in chamber 2. The electrolytic treatment not only removes most of the tin but also precipitates various impurities as slimes, while leaving a relatively high concentration of hydrochloric acid in the solution. If the washing solution already contains hydrochloric acid before it is introduced into chamber 2, it absorbs that much less hydrogen chloride, thereby reducing the demand on the generator 3 and improving the economy of the system.

By generating the hydrogen chloride in a separate generator 3 as described, the gas has opportunity to cool before being introduced into chamber 2. In hot climates it may be necessary to provide special cooling equipment to maintain the chamber 2 at a sufficiently low temperature, but in most regions this is not necessary.

It is to be understood that tin may be removed from tin plate by treating it with hydrochloric acid solution produced in other ways than by dissolving hydrogen chloride in a water film on the scrap. The chief advantages of the particular method described are that (1) better penetration into folds and pockets of the tin scrap is secured than if the scrap were simply treated with hydrochloric acid, and (2) great economy is effected as a result of the fact that a relatively concentrated solution of hydrochloric acid is produced only where it is needed, namely, on the surface of the scrap to be treated.

To obtain maximum economy the hydrogen chloride introduced into chamber 2 should be relatively dry; otherwise, it may condense with the water vapor and drop to the bottom of the chamber, where it would produce no useful effect. The generator 3, employing NaCl and $H_2SO_4$ produces relatively dry hydrogen chloride. On the other hand, if it were attempted to generate hydrogen chloride by boiling hydrochloric acid, considerable water vapor would pass over with the hydrogen chloride, with the objectionable result noted above.

Instead of initially moistening the tin plate merely by placing it in contact with cold water, as previously indicated, further advantage may be obtained by washing the scrap with steam. The steam is much more effective in removing grease and dirt and is peculiarly effective in displacing air from folds and pockets in the scrap, leaving (when the steam condenses) a film of water over the surfaces of such folds and pockets. The hydrogen chloride then rapidly follows this film of water into the crevices and pockets.

Scrap cleaned with steam may be placed in the chamber 2 while still warm, since it will cool in the chamber to a temperature below which the iron will not dissolve, before any appreciable area of iron has been exposed by removal of the tin. The initial high temperature accelerates the action of the hydrochloric acid on the tin.

The scrap may also be washed in a caustic solution to remove grease but the steam treatment is preferred as it is more effective and less expensive. After treatment with a caustic solution the scrap would have to be rinsed.

The essence of the invention resides in the treatment of wet scrap with relatively dry hydrogen chloride and various specific methods and apparatus other than that shown may be employed, the drawing and description merely referring to one possible method of practising the invention. Thus it is readily conceivable that the essential principle of the invention may be employed with apparatus adapted to function continuously instead of intermittently, thereby achieving greater capacity and economy of operation. The invention is therefore to be limited only to the extent defined in the appended claims.

I claim:

1. The method of recovering tin from tin plate which consists in first depositing on the tin plate a film of water and then exposing the moistened tin plate to hydrogen chloride gas at a temperature below 50° C.

2. The method of recovering tin from tin plate which consists in repeatedly wetting the tin plate with water, exposing the wet plate to hydrogen chloride gas for a predetermined interval, and washing the plate to remove from its surface products of reaction between the hydrogen chloride and the tin plate.

3. The method of recovering tin from tin plate which consists in washing the tin plate with steam to displace air from pockets and crevices in the tin plate and wet the surface of the plate and then exposing the wetted plate to hydrogen chloride gas at a temperature below 50° C.

4. The method of recovering tin from tin plate which consists in first depositing on the tin plate a film of water and then exposing the moistened tin plate to hydrogen chloride gas.

DAVID E. DE LAPE.